United States Patent [19]

Knothe et al.

[11] Patent Number: 4,685,525
[45] Date of Patent: Aug. 11, 1987

[54] BALANCE WITH COUNTING SCALE

[75] Inventors: Erich Knothe, Eddigehausen; Franz-Josef Melcher, Hardegsen; Christian Oldendorf, Göttingen, all of Fed. Rep. of Germany

[73] Assignee: Sartorius GmbH, Fed. Rep. of Germany

[21] Appl. No.: 898,505

[22] Filed: Aug. 21, 1986

[30] Foreign Application Priority Data

Aug. 23, 1985 [DE] Fed. Rep. of Germany ....... 3530170

[51] Int. Cl.$^4$ ..................... G01G 19/40; G01G 13/14; G01G 19/00
[52] U.S. Cl. ..................... 177/25; 177/165; 177/200
[58] Field of Search ................. 177/25, 164, 165, 200

[56] References Cited

U.S. PATENT DOCUMENTS

| 4,375,243 | 3/1983 | Doll | 177/25 |
| 4,447,885 | 5/1984 | Biss | 177/25 X |
| 4,493,384 | 1/1985 | Yano et al. | 177/25 |
| 4,512,428 | 4/1985 | Bullivant | 177/25 |
| 4,566,070 | 1/1986 | Tanaka | 177/25 X |
| 4,597,458 | 7/1986 | Knothe et al. | 177/164 |
| 4,629,016 | 12/1986 | Knothe et al. | 177/25 |

Primary Examiner—George H. Miller, Jr.
Attorney, Agent, or Firm—Eric P. Schellin

[57] ABSTRACT

The invention indicates a balance with counting scale in which the resolution of the balance with counting scale can be increased in the determination of the reference weight of light pieces without an additional switching key operated from the outside. To this end, a comparator (14) is present in the built-in electronic circuitry which is actuated when the transfer key (8) is pressed and which frees the transfer of the weight into the memory (16) and the determination of the average individual weight when a set threshold is exceeded, while, when this threshold is dropped below, it does not free the transfer of the weight into the memory and increases the resolution of the balance by a given factor.

4 Claims, 3 Drawing Figures

4,685,525

BALANCE WITH COUNTING SCALE

BACKGROUND OF THE INVENTION

The invention relates to a balance with counting scale with a tare key for setting the display to zero and with a transfer key which can bring about the transfer of the weight of a certain number of pieces for determination of the average individual weight into a memory of the built-in electronic circuitry.

This type of balance with counting scale is generally known; e.g. DE-OS No. 32 15 962 describing a special embodiment.

Balances with counting scale generally require a very great resolution, since on the one hand great quantities are weighed and therewith counted on the balance, yet, on the other hand, very small loads must also be weighed sufficiently accurately in order to determine their individual weight. Therefore, dual-function balances are frequently used as balances with a counting scale. The determination of the individual weight is then performed in the more sensitive range and the determination of larger quantities in the coarse range, i.e. less sensitive.

These dual-function balances with counting scale have the disadvantage that another key and another switch are required to switch from one function to the other, thus making the operating panel of the balance less compact.

The invention therefore has the objective of improving a balance with counting scale of the type initially mentioned in such a manner that it is possible to change the balance resolution without the balance requiring a separate function switching key.

SUMMARY OF THE INVENTION

The invention achieves this as follows: A comparator is present in the built-in electronic circuitry which is actuated when the transfer key is pressed and which frees the transfer of the weight into the memory and the determination of the average individual weight when a set threshold is exceeded, while, when this threshold is dropped below, it does not free the transfer of the weight into the memory and increases the resolution, i.e. sensitivity of the balance by a given factor.

Thus, the enlarging of the balance resolution occurs automatically as soon as the net value in the display drops below a certain, i.e. selected threshold when the transfer key is pressed.

The change in the balance resolution is advantageously indicated to the user in the balance display panel. This can occur, for example, by causing an additional symbol to light up or by a blinking of the weight display.

It is advantageous if the balance with counting scale comprises another comparator which switches the balance resolution to its normal value if another, larger threshold is exceeded, in order to avoid false weighings with the increased resolution in the case of large loads.

BRIEF DESCRIPTION OF THE DRAWINGS

The invention is explained below with reference made to the figures.

DETAILED DESCRIPTION OF THE INVENTION

Figure 1:
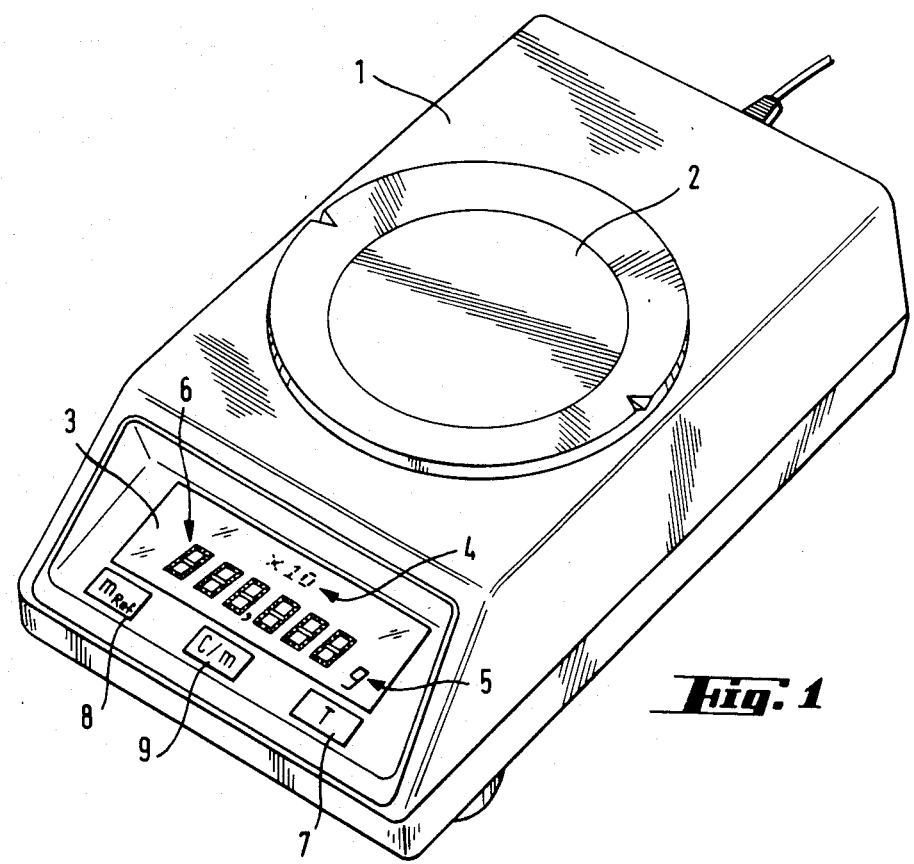
FIG. 1 shows an outer view of the balance with counting scale with its operating and display panel.

The balance with counting scale shown in FIG. 1 consists of housing 1, balance scale 2, display panel 3 and operating keys 7, 8 and 9. Display panel 3 includes digital display 6, display 5 of the measuring unit, e.g. "g" when weighing or "C" (=count) when counting, and panel 4 for displaying additional symbols. In FIG. 1 the additional symbol "×10" is being displayed. Operating key 7 is for taring, that is, for setting the display to zero, transfer key 8 is for transferring weight of a given, counted reference amount and the other key 9 is for switching as desired between counting and weighing.

Figure 2:
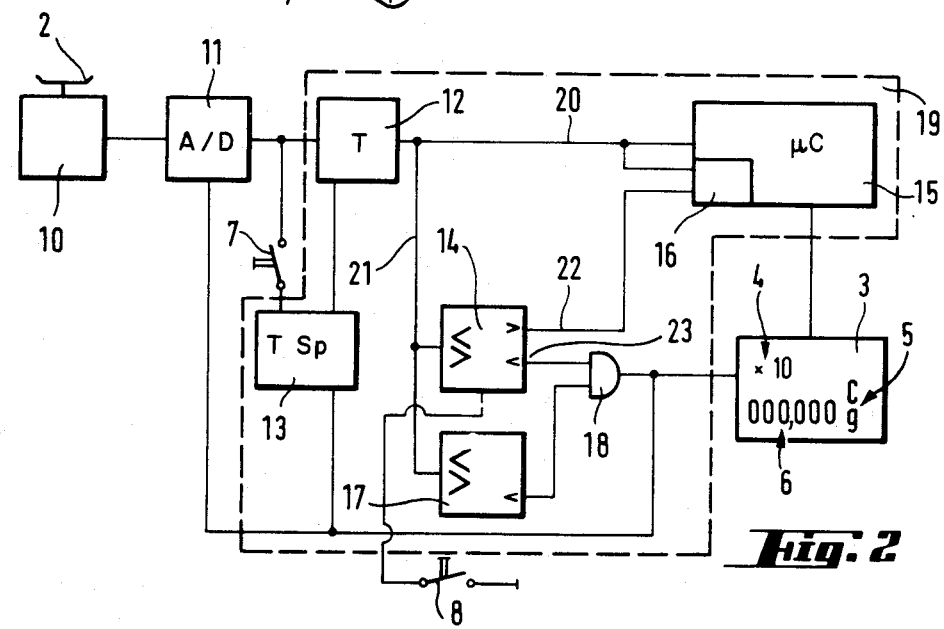
FIG. 2 shows a block diagram of the balance with counting scale.
Figure 3:
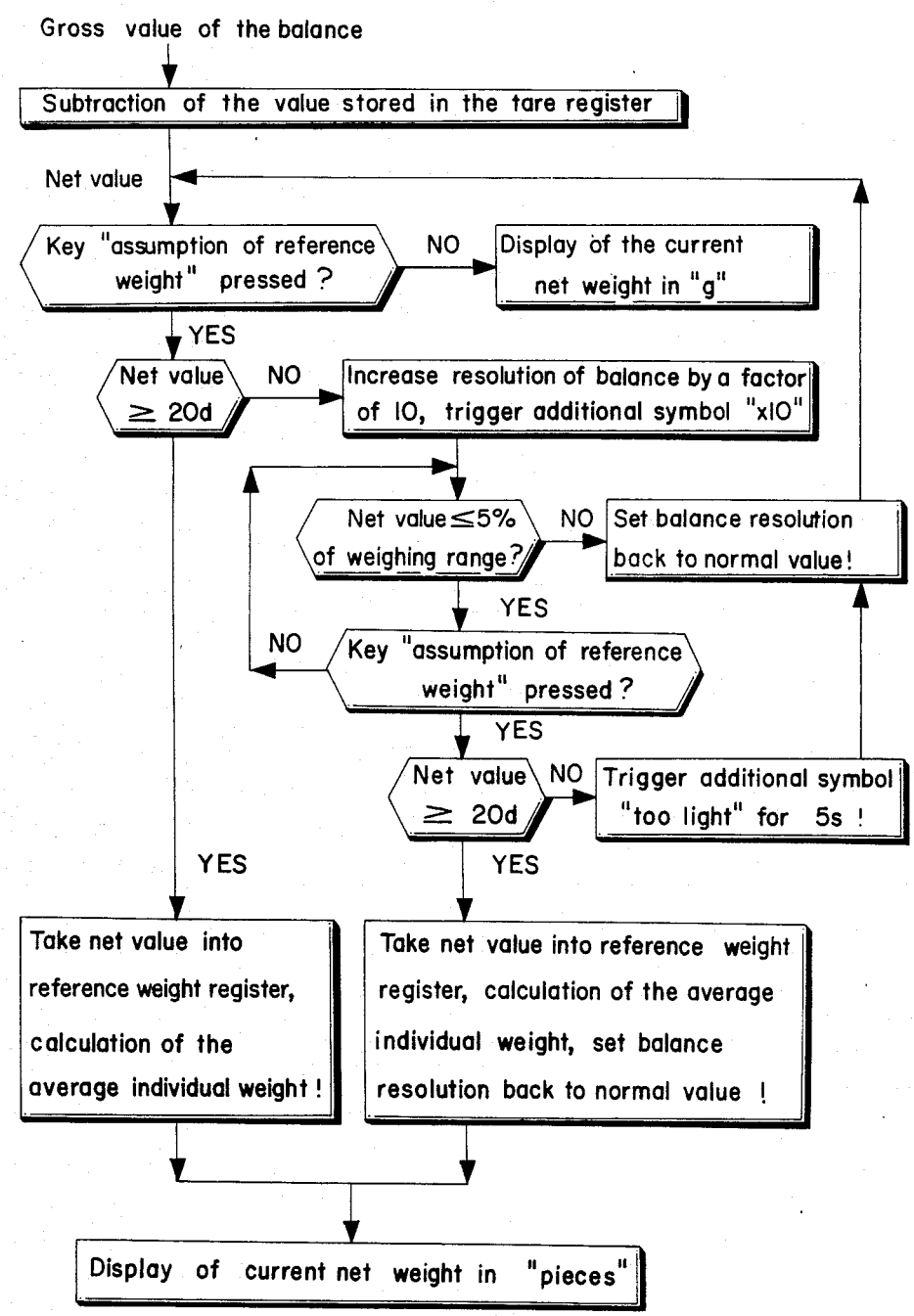
FIG. 3 shows the course of the initializing phase of the balance with counting scale in the form of a flow chart.

The operation of the balance with counting scale is apparent from the block diagram in FIG. 2 and the associated flow chart in FIG. 3. The gross measured value coming from measured value receiver 10 of the balance is digitized, if it is not already in digital form, in analog-to-digital converter 11 and supplied to taring unit 12. There, the stored value is subtracted in a known manner in tare memory 13 from the current measuring value and the net value is formed in this manner. Tare key 7 loads tare memory 13 thereby. The net value is supplied via lead 20 to arithmetic unit 15 and is passed unchanged from there, e.g. during the weighing operation, to display panel 3 and displayed as weight value 6 with the unit symbol 5 "g". The net value is supplied further via lead 21 to comparator 14, where it is compared with a set threshold of e.g. 20 digits. After the given quantity (e.g. 10 pieces) has been placed on balance scale 2, comparator 14 is actuated by actuating transfer key 8. If the net value exceeds the set threshold thereby, a signal appears on output 22 of comparator 14. This signal controls unit symbol "C" in display panel 3 and also brings it about that in arithmetic unit 15 the net value is retrieved into memory 16, the average individual weight of the placed pieces is calculated therefrom and the net weight values supplied via lead 20 are divided by the average individual weight and passed on therewith as an indication of quantity to display panel 3. This terminates the customary initializing process of the balance with counting scale.

If, however, the net value is smaller than the set threshold of e.g. 20 digits when transfer key 8 is actuated, then no signal appears on output 22 of comparator 14, but rather output 23 carries a signal. After this signal passes through AND gate 18, it causes additional symbol 4"×10" to be selected in display panel 3, analog-to-digital converter 11 to determine the current weight value with a resolution increased by a factor of 10, e.g. by extending the integration time by a factor of 10, and causes the tare value in tare memory 13 to be shifted correspondingly by a decade, so that the net value on the output of taring unit 12 is likewise available with a 10 times greater resolution. Output 23 has a storing function thereby, i.e. the signal on output 23 remains until a new comparison with the set threshold occurs by pressing transfer key 8 again.

Thus, the balance with counting scale of the invention automatically switches to a higher resolution when the weight of the pieces to be counted is too small. The operator recognizes this switching by the illumination of additional symbol 4 in display panel 3 and can let the average individual weight determined more precisely by a factor of 10 be transferred into memory 16 of arithmetic unit 15 by pressing transfer key 8 again. It is assumed thereby that the net value exceeds the set threshold of e.g. 20 digits with 10 times greater resolution. If this is not the case, the resolution could be raised again by a factor of 10, if the construction of the balance permits, (with the display of the additional symbol "×100"), or the reference quantity assumed to be 10 pieces in the example can be raised to be 20 pieces (indicated to the operator by an additional symbol "add 10", or the pieces to be counted are finally rejected as being too light for the balance with counting scale used (as is indicated in the flow chart of FIG. 3). Any expert can readily execute details of these embodiments. The second comparator 17 shown in FIG. 2 has the function, in conjunction with AND gate 18, of limiting a weighing with the increased resolution to small loads, e.g. 5% of the weighing range. The threshold in this comparator 17 is set at this 5% of the weighing range. Thus, the output only emits a signal in the case of net values below 5% of the weighing range, so that gate 18 remains open only in this range.

The operating person can of course also press transfer key 8 when no reference pieces have been set, that is, when the net weight is zero, thus naturally also passing automatically into the operating mode with increased resolution.

Various embodiments of the invention are naturally possible: Thus, for example, increased resolution can be indicated to the operating person by a blinking of the display instead of by the illumination of an additional signal. Or, the hardware components in FIG. 2 can be replaced by a microprocessor which comprises dotted area 19 and in which the individual operations are performed by software.

What is claimed is:

1. Balance with counting scale with a tare key (7) for setting the display to zero and with a transfer key (8) which can bring about the transfer of the weight of a certain number of pieces into a memory (16) of the built-in electronic circuitry for determination of the average individual weight, characterized in that a comparator (14) is present in the built-in electronic circuitry which is actuated when the transfer key (8) is pressed and which frees the transfer of the weight into the memory (16) and the determination of the average individual weight when a set threshold is exceeded, while, when this threshold is dropped below, it does not free the transfer of the weight into the memory and increases the resolution of the balance by a given factor.

2. Balance with counting scale according to claim 1, characterized in that when the threshold is dropped below, the comparator (14) selects an additional symbol (4) in the display panel (3).

3. Balance with counting scale according to claim 1, characterized in that when the threshold is dropped below, the comparator (14) generates a blinking of the weight display (6).

4. Balance with counting scale according to one of claims 1 to 3, characterized in that another comparator (17) is present which switches the balance resolution to its normal value when another set threshold is exceeded which is greater than the first set threshold.

* * * * *